UNITED STATES PATENT OFFICE.

SAMUEL F. HENDERSON, OF WOODWARDVILLE, MARYLAND, ASSIGNOR TO THE YESTER-LAID EGG CO., OF WOODWARDVILLE, MARYLAND, A CORPORATION OF MARYLAND.

ART OF PRESERVING EGGS.

1,174,008. Specification of Letters Patent. Patented Feb. 29, 1916.

No Drawing. Application filed August 28, 1915. Serial No. 47,797.

*To all whom it may concern:*

Be it known that I, SAMUEL F. HENDERSON, a citizen of the United States, residing at Woodwardville, in the county of Anne Arundel and State of Maryland, have invented certain new and useful Improvements in the Art of Preserving Eggs, of which the following is a specification.

This invention relates to an improvement in the art of preserving eggs.

The invention also relates to an egg treated for preservation.

Heretofore many suggestions have been offered and attempts made to treat eggs while fresh with material intended to preserve their fresh characteristics. The methods heretofore suggested and materials employed have, as far as I have been informed, been more or less objectionable, for various reasons. Some of the materials and methods employed affect the taste of the egg, discolor the shell, leave objectionable deposits on the shells, and in other particulars have been found to be unsatisfactory.

It has been appreciated heretofore that were it possible to so treat a fresh egg that it could be preserved in its natural condition substantially with a maintained natural color, taste and bulk, it would be a highly desirable and important discovery. I believe I have discovered a method and material for effecting this desirable result in a satisfactory manner.

The invention may be stated as comprehending primarily the application of an odorless, colorless and tasteless substance, in the form of a liquid, to the shell of an egg, as distinguished from a substance which leaves an objectionable coating on the shell.

The invention also comprehends the application of a substance to the shell of an egg, which is characterized as having the quality of rapid penetration of the shell of the egg with a view of preventing the ingress or passage of moisture to or from the egg and also for preventing the passage of destructive bacteria into the eggs through the shell.

A freshly laid egg has a coating of gelatinous substance, which is commonly known as "bloom." It is recognized that this substance has a preserving tendency, but is soon dissipated or destroyed when exposed to the atmosphere. The present invention includes also adding to the egg shell a substance which will in many respects resemble both in effect and in appearance the aforementioned natural bloom.

The material with which I treat the eggs and which I have discovered can be used with great success for the purposes above stated, is what is known as "liquid petrolatum." This substance or material is, according to my best and present information, a mixture of hydro-carbons, chiefly of the methane group, obtained by distilling off the larger part of the lighter and more volatile portions of petroleum, the residue being purified so that the remaining substance is substantially colorless, oily, transparent, without odor or taste, and does not congeal or form a paste or waxy coating when applied or exposed.

The substance is insoluble in water and will not evaporate readily, in fact will show no appreciable loss by evaporation when exposed to normal temperature or temperatures approximating the boiling point of water. Liquid petrolatum has the property of quick penetration, and in that particular owing to its maintained liquidity, when the same is applied to the shell of an egg, the material will enter the pores of the shell material and there remain without change. With this material I believe, and as far as I now know from experiments and extensive tests, the pores of the shell are not entirely or completely closed, as would be the case with a waxy material, such as paraffin or paraffin oil. This I believe is important from a scientific standpoint inasmuch as by the partial sealing of the pores, objectionable or destructive bacteria are prevented from entering through the pores, while the molecules of oxygen and ozone are permitted to enter through the shell.

It is known that ozone is a bacteria destroyer and therefore desirable to have enter the shell to prevent fermentation or change of the shell contents. By permitting ozone to enter while preventing bacteria from entering through the shell, the destructive action of any bacteria which may be contained in the shell is modified or checked.

It may be noted also that the material liquid petrolatum "petroleum liquidum" possesses the characteristics of being uninjurious to the human system, and being an oil, is moisture repellent.

Eggs treated with liquid petrolatum, either at a normal temperature or at a highly heated temperature possess general characteristics which will preserve the egg and render the shell moisture repellent and germ proof. It does not impair the egg in any material respect, the moisture of the contents of the egg being prevented from escaping through the oil treated shell.

Eggs treated with liquid petrolatum can be placed in cold storage and there kept for many months, thereafter removed and allowed to remain under normal temperature conditions without deteriorating for many weeks. This is an advantage as it is now known that untreated eggs when taken from storage deteriorate within a very few days.

The material "liquid petrolatum" or its equivalent I have found represents a very satisfactory and successful artificial bloom, the natural bloom being recognized as an important preservative for the egg for a very short duration of time. In this particular it may also be observed that the material being of an oily character gives a "bloomy" appearance to the shell so that the egg has the appearance of freshly laid and this is maintained until the egg is used.

In carrying out the method, the eggs in quantities if desirable, may be placed in a wire basket or other reticulated carrier, immersed in a bath of liquid petrolatum. The eggs are allowed to stand in the bath for a short period of time which will differ according to the temperature of the liquid. It has been ascertained that fifteen seconds is ample time for treating the eggs at a normal temperature of the liquid. The eggs are removed from the bath after treatment and placed on any convenient form of drain table and the surplus liquid permitted to flow from the shell. In this condition the eggs are ready for storage or the market.

While I have found liquid petrolatum is very successful for the purposes specified, I wish it understood that other light oils, if possessing the same or general characteristics of liquid petrolatum, may be employed without departing from the invention, and I do not wish my patent protection to be limited to the specific material. I believe, however, I am the first to ever discover that by treating an egg with a substance having the characteristic above outlined, a very beneficial and useful result is obtained and therefore I do not wish to be limited to the specific material.

Having thus described the invention, what is claimed is:

1. The method of preserving eggs consisting in treating the shells thereof with a substance consisting of a mixture of hydrocarbons, chiefly of the methane series, obtained by distilling off most of the lighter and more volatile portions from petroleum, purifying the residue so that the remaining substance is substantially colorless, oily, transparent, is without odor or taste, and not readily evaporable.

2. The method of preserving eggs consisting in treating the entire shell thereof with liquid petrolatum.

3. The method of treating eggs consisting in subjecting the eggs to a bath of liquid petrolatum, removing the eggs from the bath and permitting the surplus to flow from the shell.

4. The method of preserving eggs consisting in treating the shell thereof with a substance having substantially the characteristics of liquid petrolatum.

5. The method of treating eggs for preserving purposes consisting in applying to the shell of the egg throughout, a substantially colorless, tasteless, transparent, non-volatile mineral oil.

6. An egg having its shell treated with liquid petrolatum.

7. An egg having its shell treated with an oil which possesses substantially the characteristics of liquid petrolatum.

8. An egg having its shell treated with a hydrocarbon oil which possesses the characteristics of liquid petrolatum.

9. A method of preserving eggs consisting in coating the shell thereof with liquid petrolatum.

10. The method of producing an artificial bloom for egg shells consisting in applying to the shell liquid petrolatum.

In testimony whereof I hereunto affix my signature in the presence of a witness.

SAMUEL F. HENDERSON.

Witness:
    ALFRED B. DENT.